UNITED STATES PATENT OFFICE.

HENRY H. BEACH, OF ROME, NEW YORK.

FEED FOR HORSES AND CATTLE.

SPECIFICATION forming part of Letters Patent No. 232,327, dated September 21, 1880.

Application filed January 17, 1880.

*To all whom it may concern:*

Be it known that I, HENRY H. BEACH, of Rome, Oneida county, New York State, have invented a certain new and useful Improvement in Feed for Horses and Cattle, of which the following is a specification.

My present invention is an improvement on that which is described and claimed in my Letters Patent No. 174,346, dated March 7, 1876. Under my patented invention I prepared feed from Indian corn by first steam-cooking the corn and then grinding or mashing it into a coarse feed. Feed thus prepared possesses many and great advantages over ordinary feed, containing less water and a very largely increased percentage of corn-sugar, albumen, &c., over ordinary corn-feed, and offering to the stomach of the animal food much more easy of assimilation, and consequently healthier, as well as more nutritious.

The patented article, however, is open to one objection, which offers an obstacle to its general use, and that is, in grinding or crushing it under the process described in said patent quite a percentage of the corn is converted into a meal too fine to be practically available for the purposes of horse-feed, and which, if fed to the animals at all, must be mixed with other feeding material, such as hay. It has been my object to remove this objection, and with that end in view I have made the improvement which I shall now proceed to describe.

I subject the Indian corn to the same steam-cooking operation as that which is described in my aforesaid Letters Patent. After the corn has been properly steamed, and while it is still moist, in lieu of grinding it up, as formerly, I now feed it between rollers so constructed or formed and so placed with relation to one another that while crushing or breaking the kernels to some extent they act to flatten the kernels without disintegrating or breaking them up into small particles, each kernel being preserved whole in its integrity, although in a changed form.

The pair of power-driven rollers which I use are metal rollers twelve inches in diameter, set, say, from a twelfth to a sixteenth of an inch apart, each roller being longitudinally scored with parallel grooves about a thirty-second of an inch deep and half an inch apart, the rollers being so placed that the grooves on one will come about opposite the center of the spaces separating the grooves on the other. This I find to be practically the best arrangement for the purpose, although other arrangements may be used.

The action of the rollers is to crush each kernel, condensing and flattening it, bringing it to a mealy condition inside, and breaking or cracking the bran or cuticle, without, however, in any sense destroying the integrity of the grain or breaking it up into meal. The flattened product thus obtained is dried by any suitable means, and is then ready for use.

Feed thus prepared can be kept an indefinite length of time in good condition. It possesses all the nutritious properties of my patented feed, and can be fed to horses and cattle with the same freedom and ease as oats.

Having described my improvement, what I claim, and desire to secure by Letters Patent, is—

The improved feed for horses and cattle, consisting of cooked, flattened, and condensed kernels of Indian corn, as described.

In testimony whereof I have hereunto set my hand this 17th day of January, 1880.

H. H. BEACH.

Witnesses:
  E. A. DICK,
  M. GEORGII.